United States Patent
Seshadri et al.

(10) Patent No.: US 12,495,172 B1
(45) Date of Patent: Dec. 9, 2025

(54) SATELLITE RETURN LINK COMMUNICATIONS USING 1+N-ARY SIGNAL CONSTELLATION

(71) Applicant: Hughes Network Systems, LLC, Germantown, MD (US)

(72) Inventors: Rohit Iyer Seshadri, Gaithersburg, MD (US); Mustafa Eroz, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 18/826,994

(22) Filed: Sep. 6, 2024

(51) Int. Cl.
*H04N 21/2383* (2011.01)
*H04N 21/61* (2011.01)

(52) U.S. Cl.
CPC ..... *H04N 21/2383* (2013.01); *H04N 21/6143* (2013.01)

(58) Field of Classification Search
CPC .............. H04N 21/2383; H04N 21/6143
See application file for complete search history.

(56) References Cited

U.S. PATENT DOCUMENTS

| | | | | |
|---|---|---|---|---|
| 5,321,725 A * | 6/1994 | Paik | ................ | H04L 1/006 348/E7.004 |
| 7,559,076 B2 * | 7/2009 | Yu | ................ | H04N 7/173 725/127 |
| 2002/0118296 A1 * | 8/2002 | Schwab | .............. | G01N 33/6893 348/E7.015 |
| 2005/0162886 A1 * | 7/2005 | Jeong | ................ | H04H 40/27 365/63 |
| 2009/0328088 A1 * | 12/2009 | Harris | ................ | H04N 21/4532 725/10 |
| 2013/0028335 A1 * | 1/2013 | Limberg | ................ | H04L 1/005 375/240.27 |
| 2022/0209851 A1 * | 6/2022 | Chen | .............. | H04L 27/364 |
| 2024/0224116 A1 * | 7/2024 | Seshadri | ........... | H04L 25/03834 |

* cited by examiner

*Primary Examiner* — Michael B. Pierorazio
(74) *Attorney, Agent, or Firm* — Kilpatrick Townsend & Stockton LLP

(57) ABSTRACT

Systems and methods are described for generating and implementing return-link satellite communications using a novel 1+N-ary constellation. The 1+N-ary constellation arranges M (e.g., 8) constellation points in a novel formation that increases their distances from each other relative to conventional M-ary modulation schemes by locating an inner constellation point centrally with respect to an I-Q plane and distributing the remaining N (i.e., M=N+1) outer constellation points radially around the inner constellation point. 1+N amplitude and phase-shift keying (APSK) modulation can be used to map symbols to the constellation. Embodiments combine the 1+N APSK modulation with additional features, such as non-Nyquist partial response (NNPR) filtering and/or state of the art low-density parity check (LDPC) coding.

20 Claims, 13 Drawing Sheets

SATELLITE RETURN LINK COMMUNICATIONS USING 1+N-ARY SIGNAL CONSTELLATION

BACKGROUND

There has been an increasing demand for more and faster broadband access, which has increasingly congested available radio frequency (RF) spectrum allocations. This has driven a desire for increasingly efficient utilization of available bandwidth resources. A common approach to efficiently utilize spectrum, particularly in state-of-the-art satellite communication systems, has been to use digital baseband Nyquist-based pulse shaping filters at the transmitter side of the communication channel. Such filters not only better contain the transmitted signal within the available spectrum, but also tend to minimize interference to signals occupying neighboring spectral bands. At the receiver side of the channel, a baseband filter, known as a matched filter, can be employed with characteristics derived from (e.g., matching those of) the pulse shaping filter at the transmitter. Such a pair of filters can tend to maximize the signal-to-noise ratio (SNR) at the receiver, thereby improving link reliability. For example, a root-raised cosine (RRC) filter is a well-known conventional choice for pulse shaping and matched filtering and has been integrated into widely adopted standards, such as the Digital Video Broadcasting System version 2 (DVB-S2) standards and second-generation satellite extensions thereto (DVB-S2X).

SUMMARY

Embodiments described herein include systems and methods for generating and implementing return-link satellite communications using a novel 1+N-ary constellation. The 1+N-ary constellation arranges M (e.g., 8) constellation points in a novel formation that increases their distances from each other relative to conventional M-ary modulation schemes by locating an inner constellation point centrally with respect to an I-Q plane and distributing the remaining N (i.e., N=M−1) outer constellation points radially around the inner constellation point. 1+N amplitude and phase-shift keying (APSK) modulation can be used to map symbols to the constellation. Embodiments combine the 1+N APSK modulation with additional features, such as non-Nyquist partial response filtering and/or state of the art LDPC coding.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

There has been an increasing demand for more and faster broadband access, which has increasingly congested available radio frequency (RF) spectrum allocations. This has driven a desire for increasingly efficient utilization of available bandwidth resources. In the satellite return link, power efficiency can be achieved through a judicious combination of powerful error correction codes, such as low-density parity check (LDPC) codes, and digital modulations, such as phase-shift keying (PSK) and amplitude and phase-shift keying (APSK). Further, bandwidth efficiency can be achieved by using digital baseband pulse shaping filters at the transmitter side of the communication channel. Such filters not only better contain the transmitted signal within the available spectrum, but also tend to minimize interference to signals occupying neighboring spectral bands. At the receiver side of the channel, a baseband filter, known as a matched filter, can be employed with characteristics derived from (e.g., matching those of) the pulse shaping filter at the transmitter. Such a pair of filters can tend to maximize the signal-to-noise ratio (SNR) at the receiver, thereby improving link reliability. For example, a root-raised cosine (RRC) filter is a common conventional choice for pulse shaping and matched filtering and has been integrated into widely adopted standards, such as the Digital Video Broadcasting System version 2 (DVB-S2) standards and second-generation satellite extensions thereto (DVB-S2X).

Embodiments herein describe return channel communications using a novel 1+7-ary constellation. The 1+7-ary constellation arranges eight constellation points in a novel formation that increases their distances from each other relative to conventional 8-ary modulation schemes. State of the art LDPC codes are assigned to the 1+7-ary constellation. The 1+7-ary constellation represents a 1+7APSK modulation scheme, which can provide improved power efficiency relative to conventional 8PSK modulation schemes, along with appreciably lower signal-to-noise ratio for a target error rate, especially at higher bits-per-symbol rates.

Figure 1:
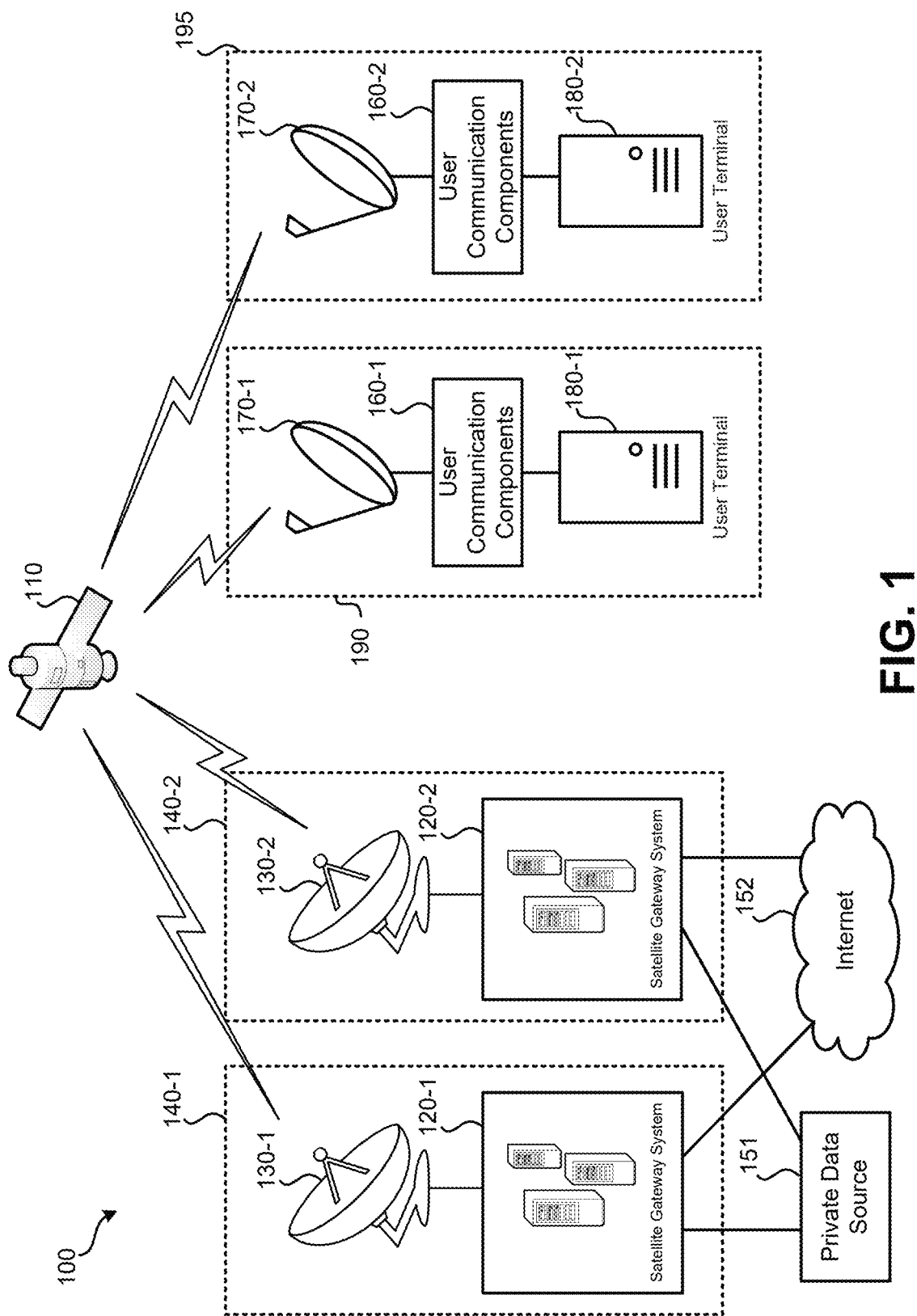
FIG. 1 illustrates an embodiment of a bidirectional satellite communication system as a context for embodiments described herein.

For added context, FIG. 1 illustrates an embodiment of a bidirectional satellite communication system 100 as a context for embodiments described herein. Bidirectional satellite communication system 100 may include: relay satellite 110; satellite gateway systems 120; bidirectional satellite communication links 130; private data source 151; user communication components 160; satellite antennas 170; and user terminals 180. Relay satellite 110 may be a bidirectional communication satellite that relays communications between satellite gateway systems 120 and user communication components 160. Therefore, via relay satellite 110, data may be transmitted from satellite gateway systems 120 to user communication components 160 and data may be transmitted from user communication components 160 to satellite gateway systems 120. Embodiments described herein focus on return-link communications to the satellite gateway systems 120 from the user communication components 160 via the relay satellite 110.

In some embodiments, system 100 may be used to provide user communication components 160 with Internet access (via Internet 152), and/or access to any other suitable public and/or private networks. Additionally or alternatively, system 100 may be used to provide user communication components 160 with access to private data source 151, which may be a private network, data source, or server system. In some architectures, satellite gateway systems 120 are in communication with backhaul infrastructure, terrestrial networks, and/or other communications infrastructure.

Relay satellite 110 may use different frequencies for communication with satellite gateway systems 120 than for communication with user communication components 160. Further, different frequencies may be used for uplink communications than for downlink communications. For example, different frequency bands, sub-bands, etc. can be used for some or all of forward uplink communications (satellite gateway system 120 to relay satellite 110), forward downlink communications (relay satellite 110 to user communication components 160), return uplink communications (user communication components 160 to relay satellite 110), and return downlink communications (relay satellite 110 to satellite gateway system 120).

Each satellite gateway system 120 is located at a respective geographic location 140. For example, satellite gateway system 120-1 communicates with relay satellite 110 using bidirectional satellite communication link 130-1, which can include one or more high-gain antennas that allow high data transmission rates between satellite gateway system 120-1 and relay satellite 110. Satellite gateway system 120-1 may receive data from and transmit data to many instances of user equipment, such as user communication components 160. Satellite gateway system 120-1 may encode data into a proper format for relaying by relay satellite 110. Similarly, satellite gateway system 120-1 may decode data received from various instances of user communication components 160 received via relay satellite 110.

Satellite gateway system 120-1 may serve as an intermediary between the satellite communication system and other data sources, such as private data source 151 and Internet 152. Satellite gateway system 121 may receive requests from user communication components 160 via relay satellite 110 for data accessible using Internet 152. Satellite gateway system 120-1 may retrieve such data from Internet 152 and transmit the retrieved data to the requesting instance of user equipment via relay satellite 110. Additionally, or alternatively, satellite gateway system 120-1 may receive requests from user communication components 160 via relay satellite 110 for data accessible in private data source 151. Satellite gateway system 120-1 may retrieve such data from private data source 151 and transmit the retrieved data to the requesting instance of user equipment via relay satellite 110.

Satellite gateway system 120-2 may function similarly to satellite gateway system 120-1 but may be located in a different physical location. While satellite gateway system 120-1 is located at geographic location 140-1, satellite gateway system 120-2 is located at geographic location 140-2. Co-located with satellite gateway system 120-2 may be bidirectional satellite communication link 130-2. Satellite gateway system 120-2 and bidirectional satellite communication link 130-2 may service a first group of user equipment while satellite gateway system 120-1 and bidirectional satellite communication link 130-1 may service another set of user equipment. Satellite gateway system 120-2 and bidirectional satellite communication link 130-2 may function similarly to satellite gateway system 120-1 and bidirectional satellite communication link 130-1, respectively.

Embodiments can use various techniques to mitigate interference between gateway systems 120. Some embodiments mitigate interference by geographic diversity. For example, geographic locations 140-1 and 140-2 may be separated by a significant enough distance such that the same frequencies can be used for uplink and downlink communications between bidirectional satellite communication links 130 and relay satellite 110 without a significant amount of interference occurring. Other embodiments use frequency diversity (e.g., multiple colors, such as different frequency bands or sub-bands) between adjacent gateway systems 120. Other embodiments use temporal diversity (e.g., different communication timing) between adjacent gateway systems 120.

While two instances of satellite gateway systems 120 and bidirectional satellite communication links 130 are illustrated as part of system 100, it should be understood that in some embodiments only a single satellite gateway system and a single bidirectional satellite communication link system are present or a greater number of satellite gateway systems 120 and bidirectional satellite communication links 130 are present. For example, for a satellite-based Internet service provider, four to eight (or significantly more) satellite gateway systems 120 and associated bidirectional satellite communication links 130 may be scattered geographically throughout a large region, such as North America.

User communication components 160, along with user terminals 180 and satellite antennas 170 (which can collectively be referred to as "user equipment") may be located in a fixed geographic location or may be mobile. For example, user communication components 160-1, satellite antenna 170-1, and user terminal 180-1 may be located at a residence of a subscriber that has a service contract with the operator of satellite gateway systems 120. The term "user" is intended only to distinguish from the gateway side of the network 100. For example, user terminal 180 can be associated with an individual subscriber to satellite communication services, with a corporate or other entity user, with a robotic user, with an employee of the satellite communication services provider, etc.

User communication components 160-1, satellite antenna 170-1, and user terminal 180-1 may be located at a fixed location 190. Fixed location 190 may be a residence, a building, an office, a worksite, or any other fixed location at which access to Internet 152 and/or private data source 151 is desired. User communication components 160-2, satellite antenna 170-2, and user terminal 180-2 may be mobile. For instance, such equipment may be present in an airplane, ship, vehicle, or temporary installation. Such equipment may be present at geographic location 195; however, geographic location 195 may change frequently or constantly, such as if the airplane, ship, or vehicle is in motion.

Satellite antenna 170-1 may be a small dish antenna, approximately 50 to 100 centimeters in diameter. Satellite antenna 170-1 may be mounted in a location that is pointed towards relay satellite 110, which may be in a geosynchronous orbit around the earth (i.e., the relay satellite 110 is a geosynchronous, or GEO, satellite). As such, the direction in which satellite antenna 170-1 is to be pointed stays constant. In some embodiments, low Earth orbit (LEO) and medium Earth orbit (MEO) satellites may be used in place of a geosynchronous satellite in the system. In some embodiments, relay satellite 110 is a high-throughput multi-beam satellite that communicates with user terminals using multiple (e.g., hundreds of) spot beams. In case of a multi-beam GEO satellite, for example, each of the multiple spot beams illuminates a respective coverage area. A fixed-location user terminal 180 can communicate with the relay satellite 110 generally via a particular one of the spot beams, unless there is some reason to reassign the user terminal 180 (e.g., in case of a gateway system 120 outage). Communications with mobile user terminals 180 can be handed off between spot beams as the mobile user terminal 180 moves through different coverage areas. In the case of non-GEO (e.g., MEO or LEO) relay satellites 110, spot beam coverage areas typically trace a path across the surface of the Earth with changes in the satellite's position relative to the Earth.

User communication component 160-1 refers to the hardware necessary to translate signals received from relay satellite 110 via satellite antenna 170-1 into a format which user terminal 180-1 can decode. Similarly, user communication components 160-1 may encode data received from user terminal 180-1 into a format for transmission via satellite antenna 170-1 to relay satellite 110. User communication components 160-1 may include a satellite communication modem. This modem may be connected with or may have incorporated a wired or wireless router to allow communication with one or more user terminals. In system 100, a single user terminal, user terminal 180-1, is shown in communication with user communication components 160-1. It should be understood that, in other embodiments, multiple user terminals may be in communication with user communication components 160-1. User terminal 180-1 may be various forms of computerized devices, such as: a desktop computer; a laptop computer; a smart phone; a gaming system or device; a tablet computer; a music player; a smart home device; a smart sensor unit; Voice over IP (VoIP) device, or some other form of computerized device that can access Internet 152 and/or private data source 151. Since user communication components 160 and a satellite antenna 170 can continue communicating with a satellite gateway system even if a user terminal 180 is not currently communicating with user communication components 160-1, it should be understood that some instances of user equipment may not include a user terminal 180.

Despite being in motion or in a temporary location, user communication components 160-2, satellite antenna 170-2, and user terminal 180-2 may function similarly to user communication components 160-1, satellite antenna 170-1, and user terminal 180-1. In some instances, satellite antenna 170-2 may either physically or electronically point its antenna beam pattern at relay satellite 110. For instance, as a flight path of an airplane changes, satellite antenna 170-2 may need to be aimed in order to receive data from and transmit data to relay satellite 110. As discussed in relation to user terminal 180-1, only a single user terminal, user terminal 180-2, is illustrated as in communication with user communication components 160-2 as part of system 100. It should be understood that in other embodiments, multiple user terminals may be in communication with user communication components 160-2. For example, if such equipment is located on an airplane, many passengers may have computerized devices, such as laptop computers and smart phones, which are communicating with user communication components 160-2 for access to Internet 152 and/or private data source 151. As detailed in relation user terminal 180-1, user terminal 180-2 may be various forms of computerized devices, such as those previously listed.

While FIG. 1 illustrates only two instances of user communication components 160, two instances of satellite antennas 170, and two instances of user terminals 180, system 100 may involve any suitable number (e.g., hundreds or thousands) of instances of satellite antennas, user equipment, and user terminals distributed across various geographic locations. Some number of these instances may be in relatively fixed locations, while others of these instances may have periodically or constantly changing locations (e.g., mobile terminals, or aero terminals for providing Internet service in aircraft, or the like). Further, while only a single relay satellite 110 is shown, some architectures include multiple satellites, such as cooperating satellites in a constellation, multiple satellites with overlapping coverage areas, etc.

As described above, a wireless communication link can generally be between any transmitter and receiver via a wireless channel. In the context of system 100, some wireless communication links are forward links between a satellite gateway system 120 (transmitter) and a user terminal 180 (receiver) via the relay satellite 110, and other wireless communication links are return links between a user terminal 180 (transmitter) and a satellite gateway system 120 (receiver) via the relay satellite 110. As described herein, any signal traversing the wireless communication link is impacted at least by filtering and/or other link effects of the transmitter (e.g., of a pulse shaping filter near the output of the transmitter), of the receiver (e.g., a matched filter near the input of the receiver), and of components of the channel (e.g., antennas and transponders of the satellite). Characteristics of these link effects can impact the spectral efficiency of the channel, such as by impacting power spectral density, bit error rate, PAPR, SNR, etc.

Figure 2:
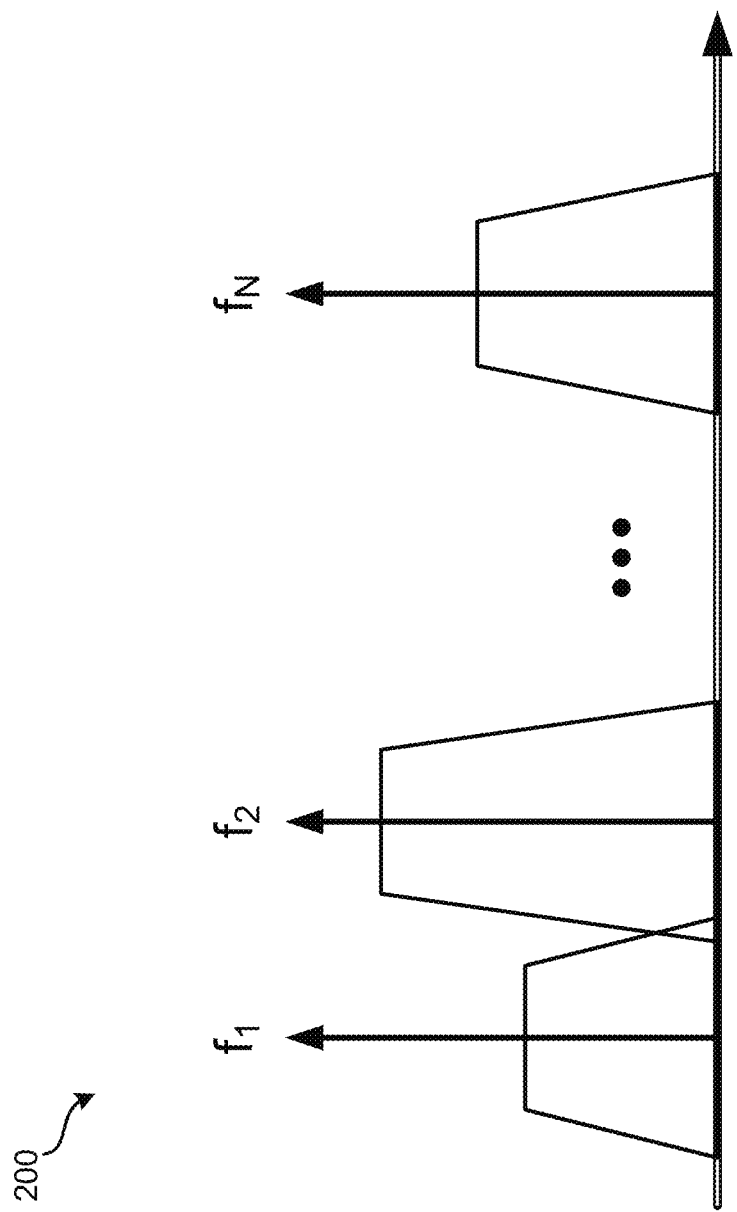
FIG. 2 shows an illustrative transmission at a particular time instant.

Embodiments described herein include novel approaches to implementing modulation schemes and/or transmit filters, such as implemented in a satellite transmitter of a user terminal 180. Some embodiments also include corresponding matched filters, such as implemented in a satellite receiver of a satellite gateway system 120. Embodiments can generally apply to return-link communications. In the satellite return link, transmissions from different users are typically assigned to an orthogonal time-frequency grid. FIG. 2 shows an illustrative transmission at a particular time instant. A total return channel bandwidth of B Hz is allocated between N carriers, each coming from a different user. Each carrier is represented as a corresponding one of N center frequencies, $f_n$. Theoretically, increasing the number of carriers increases the return-link bandwidth efficiency. However, minimizing adjacent carrier interference (ACI) involves ensuring that signals at neighboring center frequencies maintain a certain minimum separation.

The spectral characteristics depend on the choice of the pulse shaping filter. Among these, RRC filters are a popular choice, not only due to their ease of implementation, but also because their time and frequency behavior can be described by a single-parameter, the "roll-off" factor. The signal bandwidth at the RRC filter output is a function of the symbol rate $R_S$ and roll-off $\alpha$ and is defined as $R_S(1+\alpha)$ Hz. This relationship yields an inference that a smaller $\alpha$ can provide better bandwidth utilization. However, reducing $\alpha$ can yield several disadvantages, such as an increase in transmitted signal peak-to-average power ratio (PAPR), larger spectral re-growth at the high-power amplifier (HPA) output of the transmitter, sensitivity to timing jitters at the receiver, and increased non-linear distortion at the matched filter output. Heuristic approaches have been proposed to design Nyquist filter pairs that can mitigate some of the drawbacks associated with smaller roll-offs. Often the Nyquist filter pairs, such as those used in RRC filters, are based on sinusoids. In some cases, Nyquist filter pairs are designed based on wavelet functions.

A second category of pulse shaping filters does not satisfy Nyquist's ISI free criterion. By introducing a certain amount of controlled ISI at the matched filter output, these designs can achieve improved spectral properties and lower PAPR relative to Nyquist-based filters. Some well-known examples in this category include continuous phase modulation and partial response signaling filters. Some approaches also use Faster-than-Nyquist (FtN) signaling to introduce controlled ISI at the receiver by increasing the transmission rates beyond those permitted by Nyquist's ISI free criterion. Receiver-based techniques, such as based on the soft-output Viterbi algorithm, or on soft-subtractive cancellation are typically employed to recover the information in presence of controlled ISI and other impairments, such as additive noise and amplifier nonlinearity.

As used herein, a Nyquist pulse-shaped signal generally uses any waveform having a spectrum that can be represented by (via Fourier transform) a rectangular function. A classic example of Nyquist waveforms is sinusoidal functions. A non-Nyquist pulse-shaping signal generally uses any time-limited waveform that is not a Nyquist waveform and that has a well-defined time and frequency representation. A classic example of non-Nyquist waveforms is Gaussian functions.

Some embodiments described herein include a "non-Nyquist partial response" (NNPR) filter. Embodiments of such NNPR filters are described in U.S. patent application Ser. No. 18/148,565, filed Dec. 30, 2022, titled "NOVEL PULSE-SHAPING FILTERS FOR IMPROVING THE SPECTRAL EFFICIENCY OF BROADBAND SATELLITE SYSTEMS," which is incorporated herein in its entirety. Such NNPR filters are demonstrated to yield a power spectrum of the transmitted signal that has a compact main lobe and rapidly decaying side-lobes, thereby facilitating more efficient use of available spectrum and helping to reduce adjacent channel interference (ACI), as compared to conventional (e.g., RRC) filters. In general, NNPR filters largely retain compact time and frequency characteristics of non-Nyquist wavelets (e.g., a Gaussian wavelet), while facilitating improved control over ISI power at the receiver matched filter output.

Another feature of the satellite return link is that information bits are typically transmitted in short bursts. It is well established that the strength of an error correction code tends to diminish with the decreasing block length, and its successful return link communication can depend on operating in a power efficient manner. This can be achieved largely by minimizing the signal-to-noise ratio (SNR) used to achieve a target packet error rate and can involve careful design of the LDPC code and digital modulation. For a given LDPC code, the choice of bit-to-symbol mapping and the arrangement of constellation points in a modulation scheme can impact the error rate performance.

Figure 3:
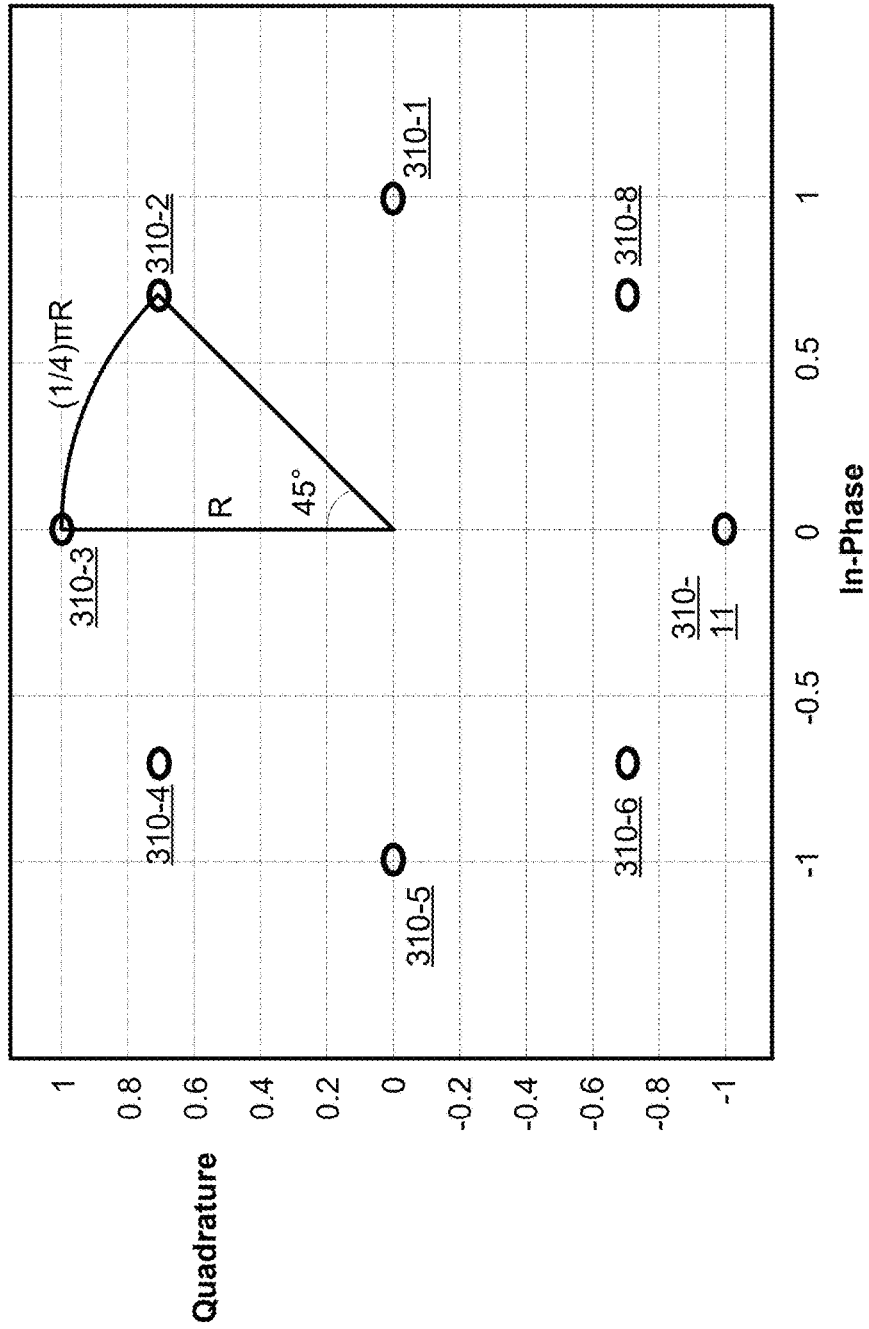
FIG. 3 shows an example scatter plot of a conventional 8-ary constellation.

Conventional 8-ary constellations for 8PSK modulation arrange eight constellation points radially in the so-called I-Q plane. FIG. 3 shows an example scatter plot 300 of a conventional 8-ary constellation. The constellation includes eight constellation points 310 (illustrated as points 310-1 through 310-8) plotted in a plane defined according to a quadrature axis and an in-phase axis. Each axis is normalized to range from −1 to 1. As illustrated, in the conventional 8-ary constellation, each constellation point 310 is located 45 degrees away from its neighbors with respect to rotation around the origin (0, 0), thereby forming a regular octagonal layout. In this layout, the arc length between adjacent constellation points 310 is nominally 1/4 πR.

As used herein, the "location" of a constellation point refers to the nominal location of its center. The terms "nominal" and "nominally" refer herein to a designed (e.g., ideal) value. For example, a constellation can be designed, tested, simulated, and implemented based on constellation points being in certain locations in the I-Q plane. Practically, however, the locations of those constellation points and/or their distributions vary from their nominal locations. For example, in well-designed systems, phase noise and quadrature errors can tend to introduce variations of a few degrees, while noise and amplitude imbalances can tend to cause point displacements of a few percent of the symbol amplitude. As one specific example, phase noise in transmitter and/or receiver oscillators can cause random fluctuations in the phase of the signal, leading to a spreading (blurring) of the constellation points around their nominal positions. As another specific example, amplitude imbalances due to imperfections in the gain of amplifiers or imbalances in the I and Q signal paths can cause constellation points to be stretched or compressed, forming elliptical rather than circular distributions. As another specific example, quadrature error due to a mismatch in the phase shift between the I and Q components (i.e., away from 90 degrees) can cause the constellation points to be rotated and not evenly spaced. Several techniques exist for mitigating these and other types of variations, such as error correction techniques, adaptive equalization techniques, carrier recovery techniques, and automatic gain control techniques.

The conventional 8-ary constellation (and corresponding 8PSK modulation) has been implemented for decades and has been incorporated into satellite communication standards at least because it provides several features. For example, the conventional 8-ary constellation is symmetric, which tends to simplify design of corresponding modulation and demodulation schemes. Conventional 8PSK has better PAPR than irregular constellation and also allows perfect Gray labelling which is known to reduce bit error rates, especially at lower SNR. However, as the SNR increases, 8PSK performance is known to degrade.

Embodiments described herein use a novel "1+N-ary" constellation corresponding to a "1+N APSK" modulation scheme, where N is an integer greater than 3. The "1+N" refers to a constellation arrangement of N+1 constellation points, in which N "outer" constellation points are arranged radially around an "inner" (e.g., central) constellation point. In one implementation, eight constellation points are arranged in a 1+7-ary constellation. In another implementation, 16 constellation points are arranged in a 1+15-ary constellation.

Figure 4:
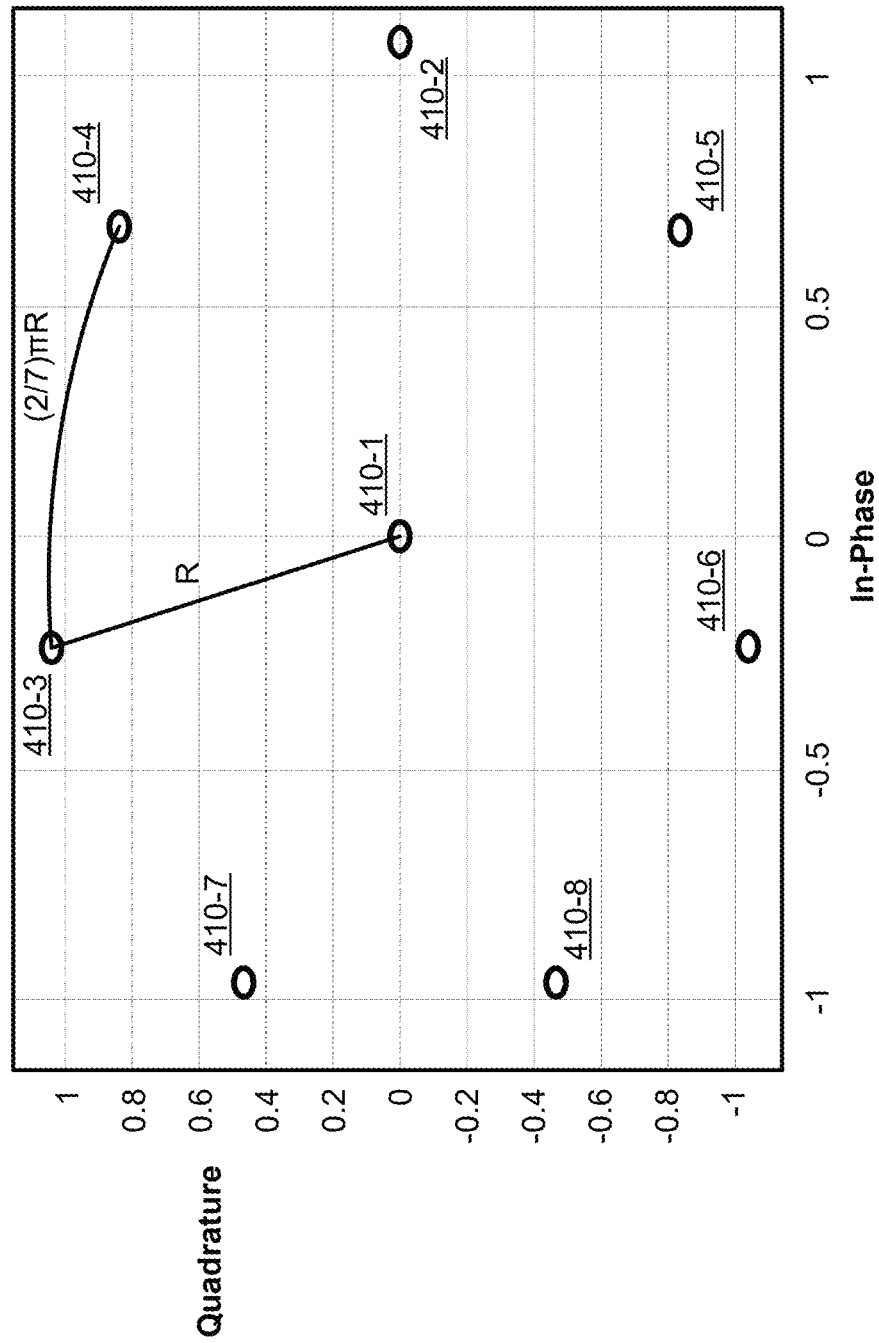
FIG. 4 shows an example scatter plot of an illustrative 1+7-ary constellation, according to embodiments described herein.

FIG. 4 shows an example scatter plot 400 of an illustrative 1+7-ary constellation, according to embodiments described herein. The constellation includes eight constellation points 410 (illustrated as points 410-1 through 410-8) plotted in a plane defined according to a quadrature axis and an in-phase axis. Each axis is normalized to range from −1 to 1. As illustrated, a first constellation point 410-1 (the inner constellation point) is located nominally at the origin of the I-Q plane. The remaining seven constellation points 410-2-410-8 (the outer constellation points) are arranged radially around the first constellation point 410-1. In the illustrated implementation, each outer constellation point 410 is angularly spaced approximately 51.4 degrees (360/7 degrees) away from its neighbors with respect to rotation around the origin (0, 0), thereby forming a regular heptagon layout. In this layout, each outer constellation point is nominally located a distance of R away from the inner constellation point, and the arc length between each adjacent outer constellation point 310 is nominally 2/7 πR.

Extending this to a 1+15-ary constellation (i.e., for 16APSK modulation), the constellation includes 16 constellation points arranged in the I-Q plane, so that a first inner constellation point is located nominally at the origin of the I-Q plane, and the remaining 15 outer constellation points are arranged radially around the inner constellation point. In such a configuration, each outer constellation point is angularly spaced 24 degrees (360/15 degrees) away from its neighbors with respect to rotation around the origin (0, 0), thereby forming a regular pentadecagon layout.

Embodiments described herein can implement 1+N APSK modulation with NNPR filters (e.g., Gaussian pulse shaping filters) for satellite return links. The NNPR filter allows adjacent carriers to be spaced closer than conventional RRC filters, while keeping the adjacent channel interference (ACI) impact and PAPR increase to very modest levels. 1+N APSK modulation can appreciably reduce the SNR requirement relative to conventional modulation schemes at spectral efficiencies greater than 2 bits-per-symbol. The NNPR filters introduce controlled inter-symbol interference (ISI), which can be cancelled at the receiver (using matched filtering, etc.). The combined use of 1+N APSK modulation and NNPR filters can provide improved error rate performance and spectral efficiency, as compared to conventional approaches.

Figure 5:
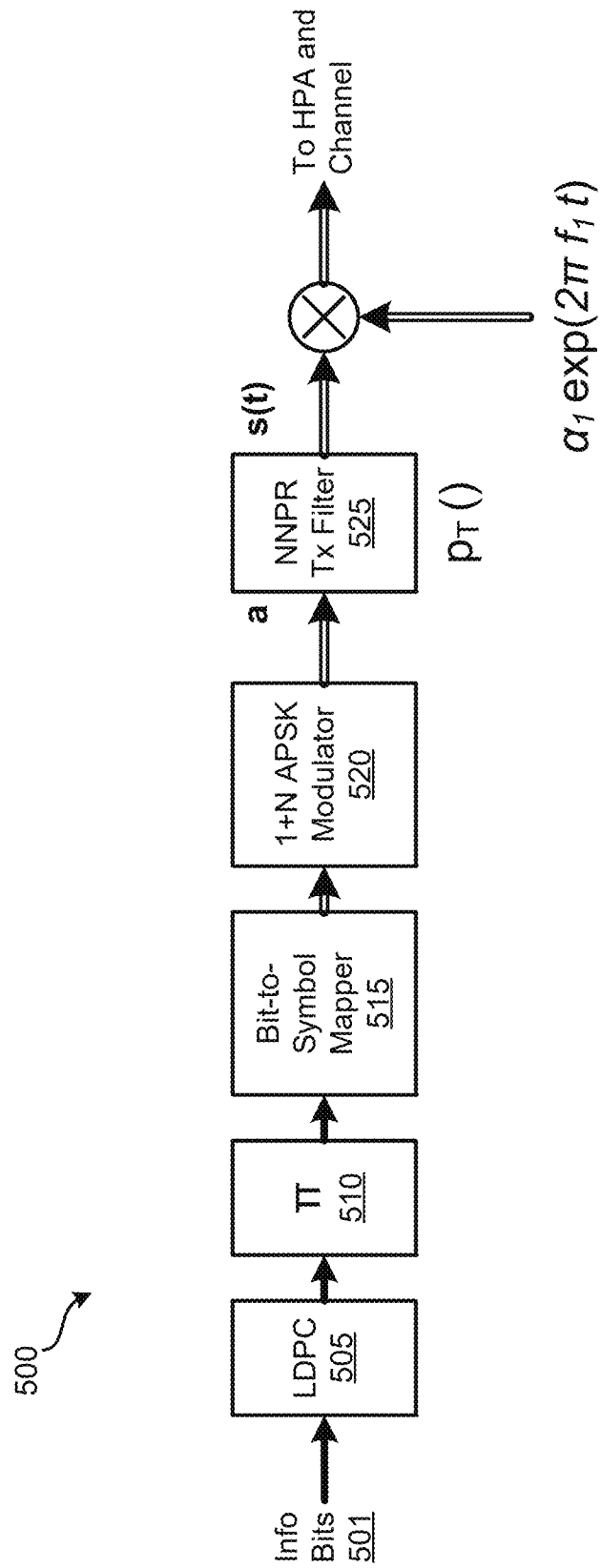
FIG. 5 shows a simplified block diagram of a portion of a baseband transmitter that includes a non-Nyquist partial response (NNPR) transmit filter, according to embodiments described herein.

FIG. 5 shows a simplified block diagram of a portion of a baseband transmitter 500 that includes a non-Nyquist partial response (NNPR) transmit filter 525, according to embodiments described herein. As described above, the baseband transmitter 500 can be implemented in the transmitter of a satellite gateway system 120 of FIG. 1, the transmitter of a user terminal 180 of FIG. 1, or at the transmit side of any suitable wireless communication link. As illustrated, the baseband transmitter 500 receives a stream of information bits 501 and outputs a transmission signal, s(t).

Embodiments of the baseband transmitter 500 include a transmitter front-end to convert the stream of information bits 501 into a modulated sequence of symbols. In the illustrated implementation, the transmitter front-end includes an error corrector (illustrated as low-density parity check (LDPC) block 505), an interleaver ("Π") block 510, a bit-to-symbol mapper block 515, and a 1+N APSK modulator block 520. The LDPC block 05 encodes the data-source transmitting stream of information bits 501 into a stream of codebits. The interleaver block 510 can interleave the codebits, and the bit-to-symbol mapper block 515 can map the interleaved codebits onto an M-ary, two-dimensional signal constellation. As described with reference to FIG. 4, the M-ary constellation is configured herein as an N+1-ary constellation, where M=N+1. For example, the bit-to-symbol mapper block 515 groups the bits into a correct order and chooses one of the M constellation points. This mapping generates a complex-valued symbol sequence, a=[$a_0$, $a_1$, ..., $a_{N-1}$]. The symbol sequence is modulated onto a data signal by the 1+N APSK modulator block 520.

Referring back to the 1+7-ary constellation illustrated in FIG. 4, such a constellation can be used by the 1+N APSK modulator block 520 to implement 1+7 APSK modulation. According to such modulation, $2^3=8$ constellation points can each represent a respective mapping for a three-bit value for each symbol. The following table illustrates one such mapping:

| Symbol | Constellation Point | | Bits | | |
|---|---|---|---|---|---|
| 1 | 0 + 0.0000i | → | 0 | 0 | 0 |
| 2 | 1.069 + 0.0000i | → | 0 | 0 | 1 |
| 3 | −0.2379 + 1.0442i | → | 0 | 1 | 0 |
| 4 | 0.6665 + 0.8358i | → | 0 | 1 | 1 |
| 5 | 0.6665 − 0.8358i | → | 1 | 0 | 0 |
| 6 | −0.2379 − 1.0442i | → | 1 | 0 | 1 |
| 7 | −0.9632 + 0.4368i | → | 1 | 1 | 0 |
| 8 | −0.9632 − 0.4368i | → | 1 | 1 | 1 |

The modulated signal with the sequence of symbols is input to the NNPR transmit filter 525, and the NNPR transmit filter 525 applies pulse shaping to generate a pulse-shaped signal at its output, s(t). The pulse-shaped signal at the output of the NNPR transmit filter 525 can be described as:

$$s(t)=\Sigma_k a_k \cdot p_T(t-kT_s) \quad (1)$$

where $T_s$ is the symbol-period (i.e., $$R_s = \frac{1}{T_s}$$

is the symbol-rate) and $p_T$ represents the impulse response of the NNPR transmit filter 525.

The impulse response $p_T$ is parametrically controllable to achieve a desired trade-off between throughput and power penalty based on at least two tunable weighting factors. Embodiments of the NNPR transmit filter 525 include a transmitter weighting controller to set the tunable weighting factors, such as based on pre-programmed settings (e.g., hard- or soft-coded in circuitry of the NNPR transmit filter 525), based on received user commands (e.g., based on manual configuration by a user), or based on automated feedback control (e.g., based on measurement of channel filter response characteristics). The pulse-shaped signal can be further modulated onto a carrier, which can be expressed as $a_1 \exp(2\pi f_1 t)$. The signal can be passed to downstream transmitter components, such as a high-power amplifier, and the pulse-shaped signal can be transmitted over a wireless channel to a receiver, along with adjacent carriers from other transmitters.

Figure 6:
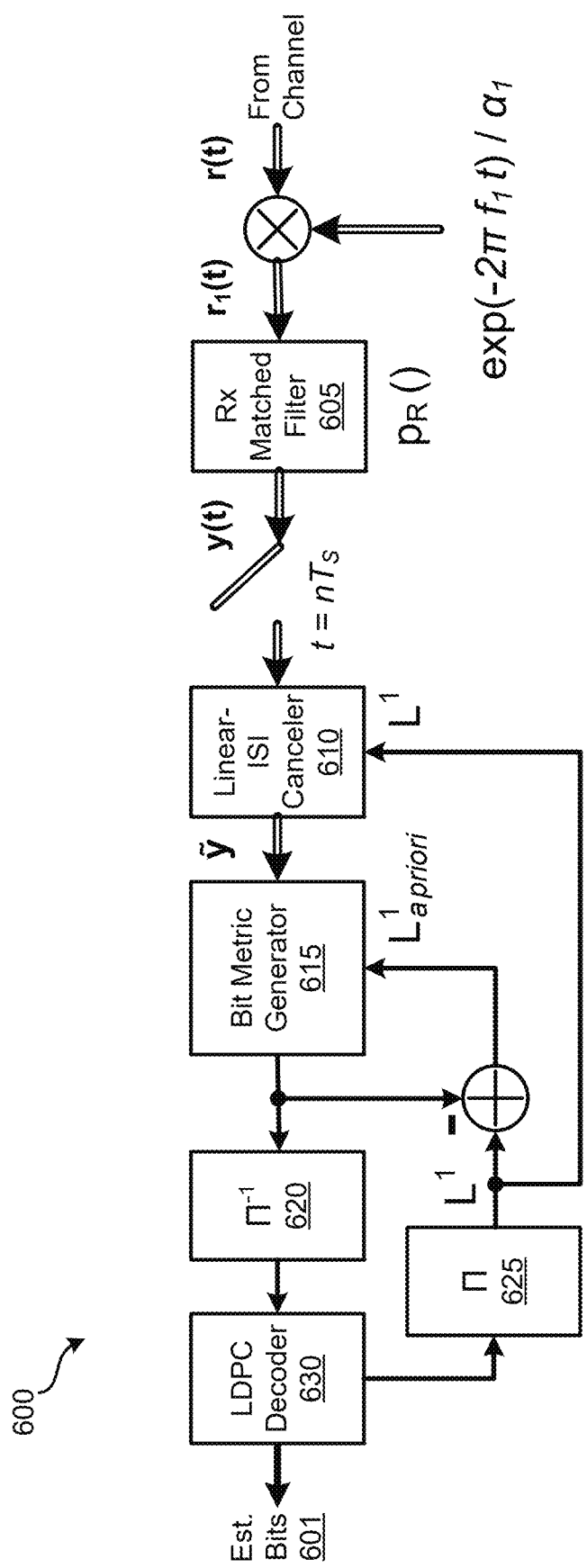
FIG. 6 shows a simplified block diagram of a receiver that includes a matched filter, according to embodiments described herein.

FIG. 6 shows a simplified block diagram of a receiver 600 that includes a matched filter 605. The receiver 600 can be implemented in the receiver of a satellite gateway system 120 of FIG. 1, the receiver of a user terminal 180 of FIG. 1, or at the receive side of any suitable wireless communication link. As illustrated, the receiver 600 receives the modulated signal including the stream of symbols from the transmitter (e.g., from baseband transmitter 500 of FIG. 5) via a wireless channel (e.g., a relay satellite), and the receiver 600 converts the stream of symbols into a stream of estimated bits 601 intended to be identical to (or at least to match as closely as possible to) the stream of information bits 501.

The spectral power properties of the modulated signal, as received by the receiver, are affected by at least characteristics of the NNPR transmit filter 525 and characteristics of the wireless channel. For simplicity, the wireless channel is assumed to be an additive white Gaussian noise (AWGN) channel. As such, the signal, as received at the receiver input, can be expressed as:

$$r(t)=s(t)+ñ(t)+i(t) \quad (2)$$

Here, ñ(t) is zero-mean AWGN with single-sided power spectral density (PSD) of $N_0$ (Watt/Hz). i(t) represents the cumulative impact of concurrent transmissions from difference users in neighboring frequency bands (ACI). As illustrated, the signal r(t) is received by a matched filter 605, and the matched filter 605 generates a corresponding matched filter output signal y(t). A sampled version of the signal y(t) is passed to a receiver back-end for conversion into the stream of estimated bits 601. In the illustrated implementation, the receiver back-end includes a linear-ISI canceler block 610, a bit-metric generator block 615, a de-interleaver ($\Pi^{-1}$) block 620, an interleaver ($\hbar$) block 625, and a LDPC decoder block 630.

The matched filter 605 can be defined as:

$$p_R(t)=p_T(-t) \quad (3)$$

Assuming ideal synchronization, the signal y(t) at the output of the matched filter 605 can be given by:

$$y(t) = \int_{-\infty}^{\infty} r(\alpha) \cdot p_R(\alpha - t) d\alpha \quad (4)$$

The signal y(t) is sampled before being passed to the receiver back-end. For example, the signal y(t) is sampled at integer multiples of the symbol-period to obtain:

$$y(nT_s)=y_n=\Sigma_l a_{n-l} g_l + n'_n; n=0,1,\ldots,N_s-1 \quad (5)$$

where n' is bandlimited Gaussian noise.

Another equation can be defined as:

$$g_l = p_R(t) * p_T(t)|_{t=lT_s} \quad (6)$$

With (6), the matched filter output y(t) in (5) can be rewritten as:

$$y_n = a_n g_0 + \sum_{\substack{l \\ l \neq 0}} a_{n-l} g_l + n'_n \quad (7)$$

It can be inferred from (7) that the matched filter output at time-instant n contains not only the desired symbol and noise, but also potential interference from post-cursor and pre-cursor transmitted symbols (i.e., ISI). The relative strength of this ISI and its time span depends on the coefficients $g_l$; $l \neq 0$, and hence on the choice of the filter-pair $\{p_T(t), p_R(t)\}$.

Initially, the vector of matched filter outputs $\{y_n\}$ is used to estimate soft-information for the LDPC decoder 630. Subsequently, soft-information from the LDPC decoder 630 in the form of log-likelihood ratios (LLRs) are converted to (soft) estimates of the transmitted symbols ã. Then, ã and ISI weights $\{g_l; l=-L,\ldots 1,\ldots,L\}$ are used to form estimates of the ISI affecting y[nT$_s$]. This can be expressed as follows:

$$ISI(nT_s)=g_{-L}ã_{n+L}+\ldots g_{-1}ã_{n+1}+g_1ã_{n-1}+\ldots g_Lã_{n-L} \quad (8)$$

Estimated ISI can be canceled by the linear-ISI canceler 610. Implementation can subtract the estimated ISI from y[nT$_s$], such that:

$$ỹ[nT_s]=y[nT_s]-ISI(nT_s) \quad (9)$$

The vector of matched filter outputs after cancellation {ỹ} can be used to calculate the soft-information for the LDPC decoder 630. The process of LDPC decoding and ISI cancellation can be repeated until a fixed number of iterations are reached or until the information bits are successfully recovered.

Figure 7:
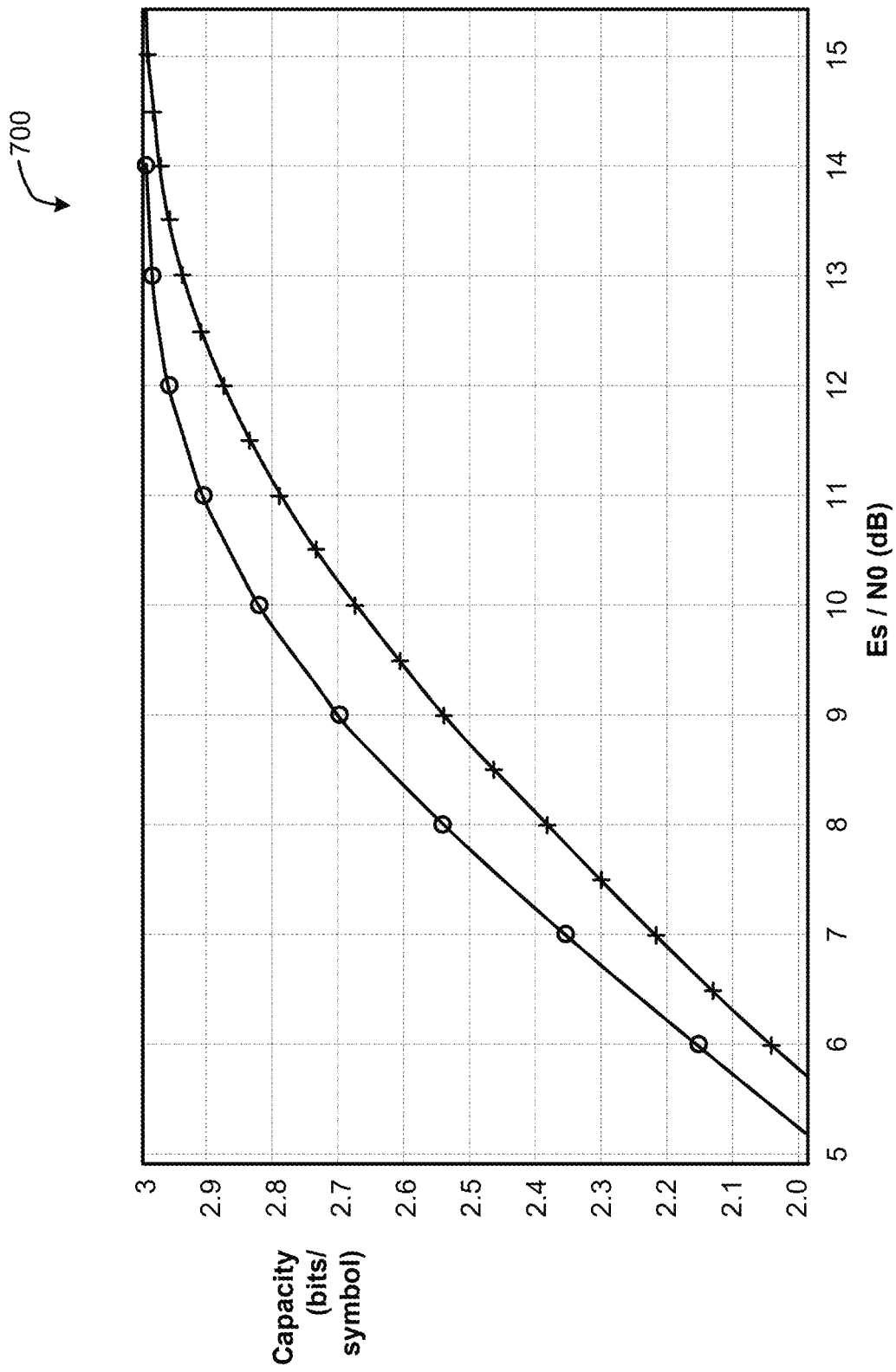
FIG. 7 shows a plot comparing modulation-constrained capacity realized by 1+7 APSK and 8PSK modulation over different signal to noise ratios.

FIG. 7 shows a plot 700 comparing modulation-constrained capacity realized by 1+7 APSK and 8PSK modulation over different signal to noise ratios (SNRs). Channel capacity refers to the maximum rate at which information can be transmitted over a communication channel with a certain bandwidth and noise level. It is influenced by factors like signal-to-noise ratio (SNR) and the modulation scheme used. In the illustrated plot 700, the SNRs are represented as a ratio of the average energy-per-symbol to the noise power spectral density (Es/N0). Although the 8 constellation points of both constellation types can theoretically support up to 3 (i.e., $\log_2 8$) bits per symbol, the practical channel capacity is typically lower.

Values are shown for spectral efficiencies ranging from 2 to 3 bits-per-symbol. A first curve 710 shows simulated results using 7+1 APSK modulation, and a second curve 720 shows simulated results using conventional 8PSK modulation. Comparing the curves, the plot 700 illustrates that 1+7APSK exhibits a lower SNR particularly at higher bits per symbol. For example, achieving quasi-error free transmission at 2.6 bits-per-symbol requires more than 9.5 dB SNR with 8PSK modulation, but less than 8.5 dB SNR with 1+7 APSK (i.e., 1-1.5 dB SNR less).

As described above, such as with reference to FIGS. 5 and 6, embodiments use 1+N APSK together with NNPR filters. Performance of such a combination can be evaluated by looking at spectrum and packet error rate (PER) performance of NNPR filters for cases when multiple carriers simultaneously access the channel. To minimize ACI, systems employing RRC filters will tend to space adjacent carriers at $\Delta_f \geq R_s(1+\alpha)$ Hz. Due to their more compact frequency spectrum, NNPR-based filtering approaches described herein can permit adjacent carriers to be packed closer together without causing additional ACI. This can result in improved spectral efficiency.

Figure 8:
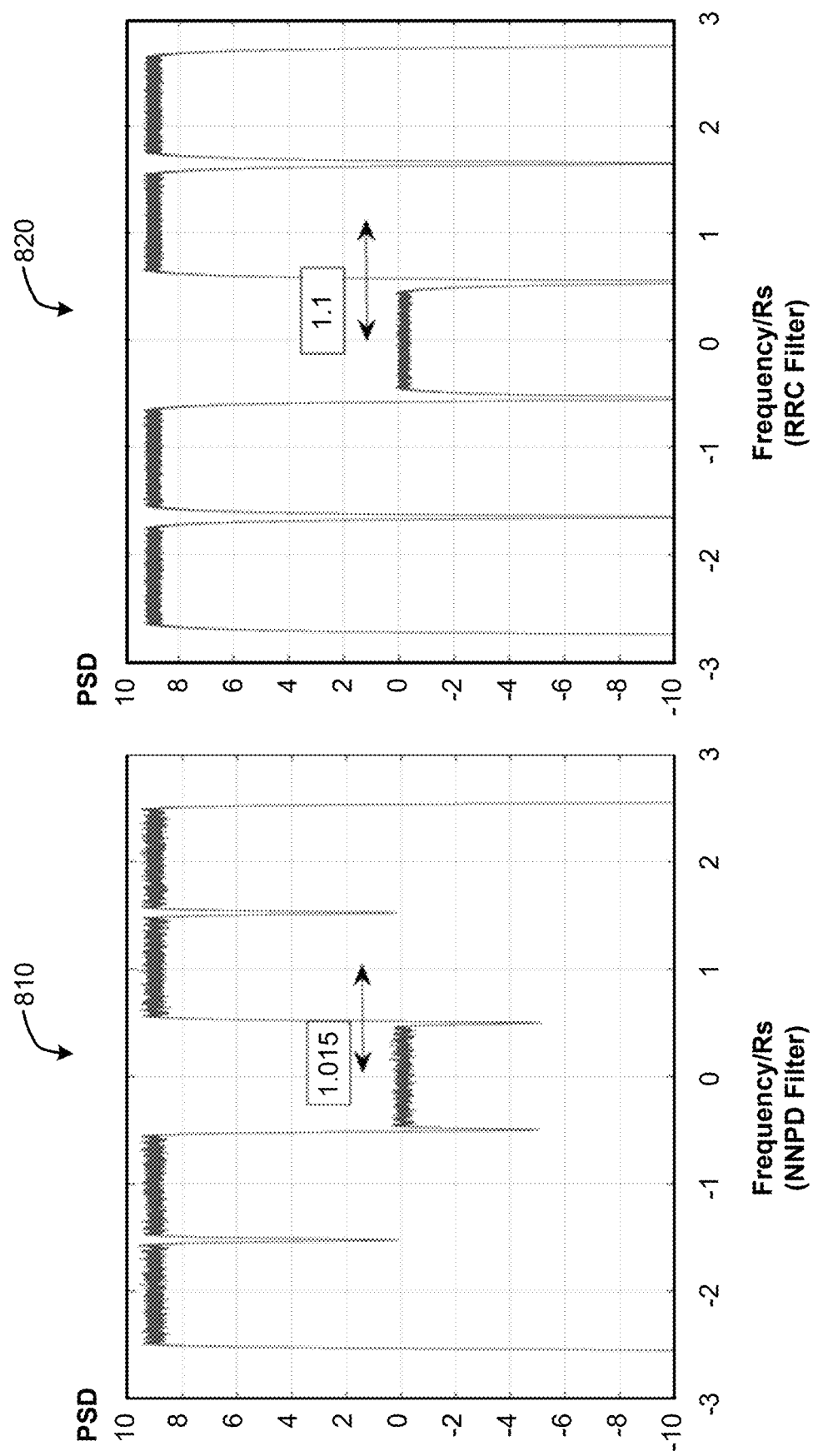
FIG. 8 shows plots of power spectral density (PSD) versus frequency per symbol rate (Rs).

FIG. 8 shows plots of power spectral density (PSD) versus frequency per symbol rate (Rs). Both plots show PSD for a 1+7 APSK signal at a desired carrier in the presence of 4 adjacent carriers (2 on either side) that are each 9 dB stronger than the desired carrier. Plot 820 illustrates that an adjacent channel spacing of at least $\Delta_f=1.1R_s$ is needed to use a conventional RRC filter with a roll-off of 0.1 for reliable transmission in such an environment. Plot 810 illustrates that an NNPR filter with $\sigma T_s=0.964$, $\gamma_f(\pm 1)=0.975$ can be used in the same environment to reliably transmit the same signal with an adjacent carrier spacing of $\Delta_f=1.015R_s$. This reduction in channel spacing translates to an 8-percent improvement in system spectral efficiency.

Figure 9A:
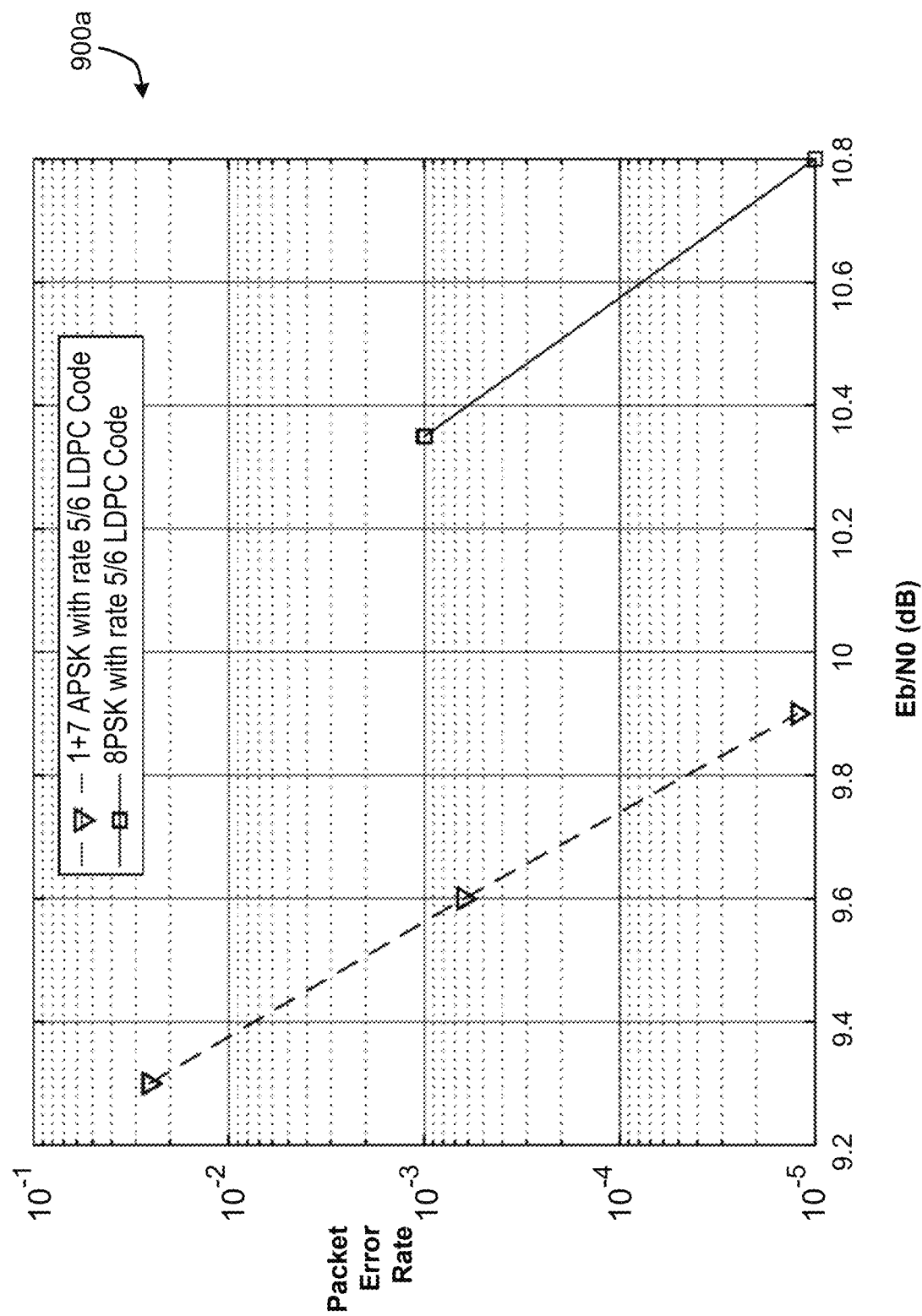
FIGS. 9A and 9B show plots of packet error rate versus SNR performance of 1+7 APSK and 8PSK with rates 5/6 and 8/9 LDPC codes, respectively.
Figure 9B:
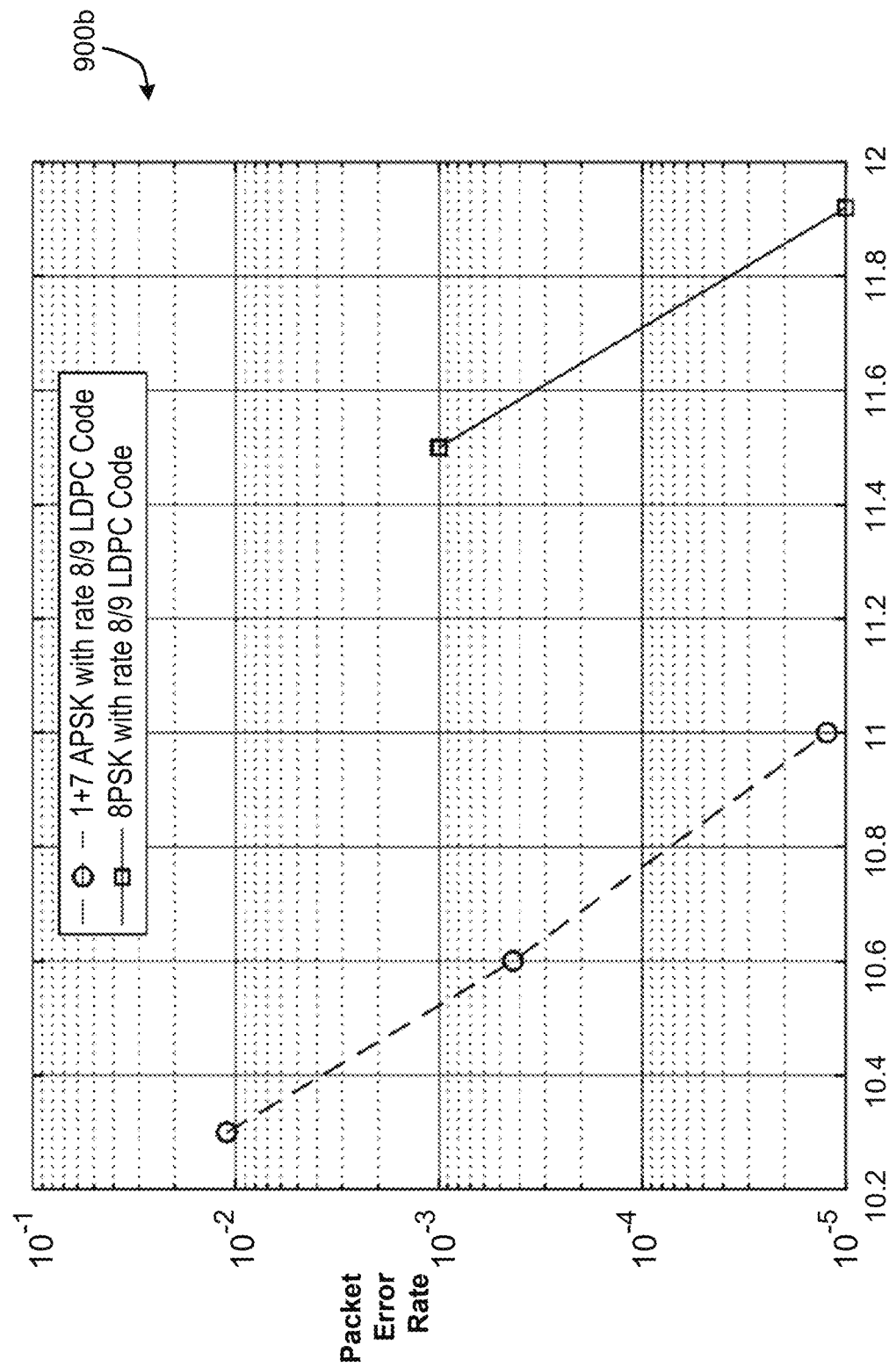

FIGS. 9A and 9B show plots 900 of packet error rate versus SNR performance of 1+7 APSK and 8PSK with rates 5/6 and 8/9 LDPC codes, respectively. The plots assume the presence of ACI from of four adjacent carriers (2 on either side) that are all 9 dB stronger than the desired carrier and with adjacent carrier spacing of $\Delta_f=1.015R_s$. The corresponding spectral efficiencies are 2.46 bits/s/Hz at rate 5/6 (FIG. 9A) and 2.63 bits/s/Hz at rate 8/9 (FIG. 9B). Also shown is the PER of 8PSK modulation with RRC filters at the same code rates. However, the adjacent carriers in this case are spaced $\Delta_f=1.1R_s$. The spectral efficiency for the 8PSK-RRC system is 2.27 bits/s/Hz at rate 5/6 (FIG. 9A) and 2.42 bits/s/Hz at rate 8/9 (FIG. 9B). These plots demonstrate that joint use of 1+7 APSK with NNPR filters offers a two-fold advantage: an appreciable reduction in SNR; and an appreciable (8%) improvement in spectral efficiency.

Figure 10A:
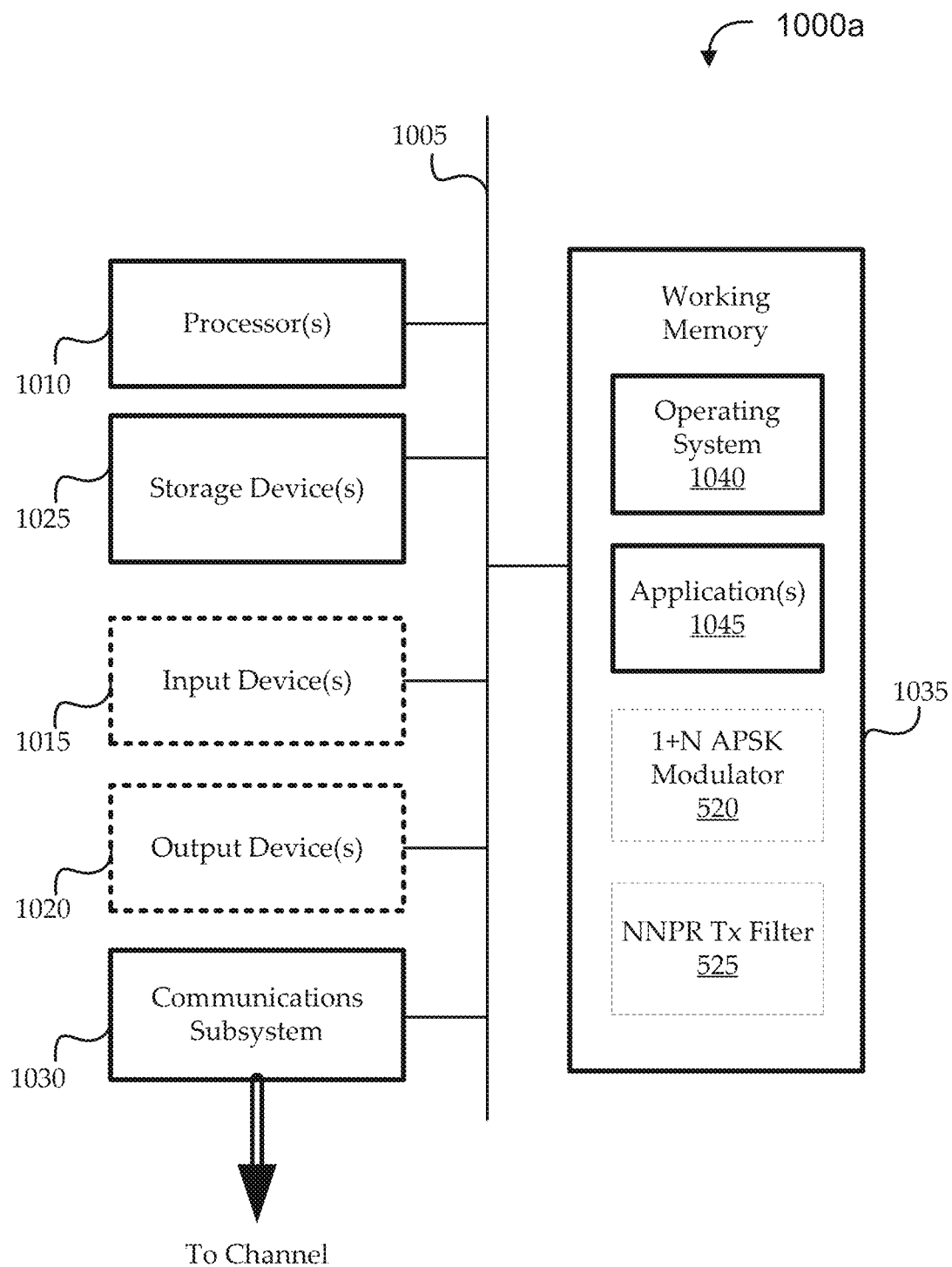
FIGS. 10A and 10B provide schematic illustrations of embodiments of a computational system that can implement various system components and/or perform various steps of methods provided by various embodiments.
Figure 10B:
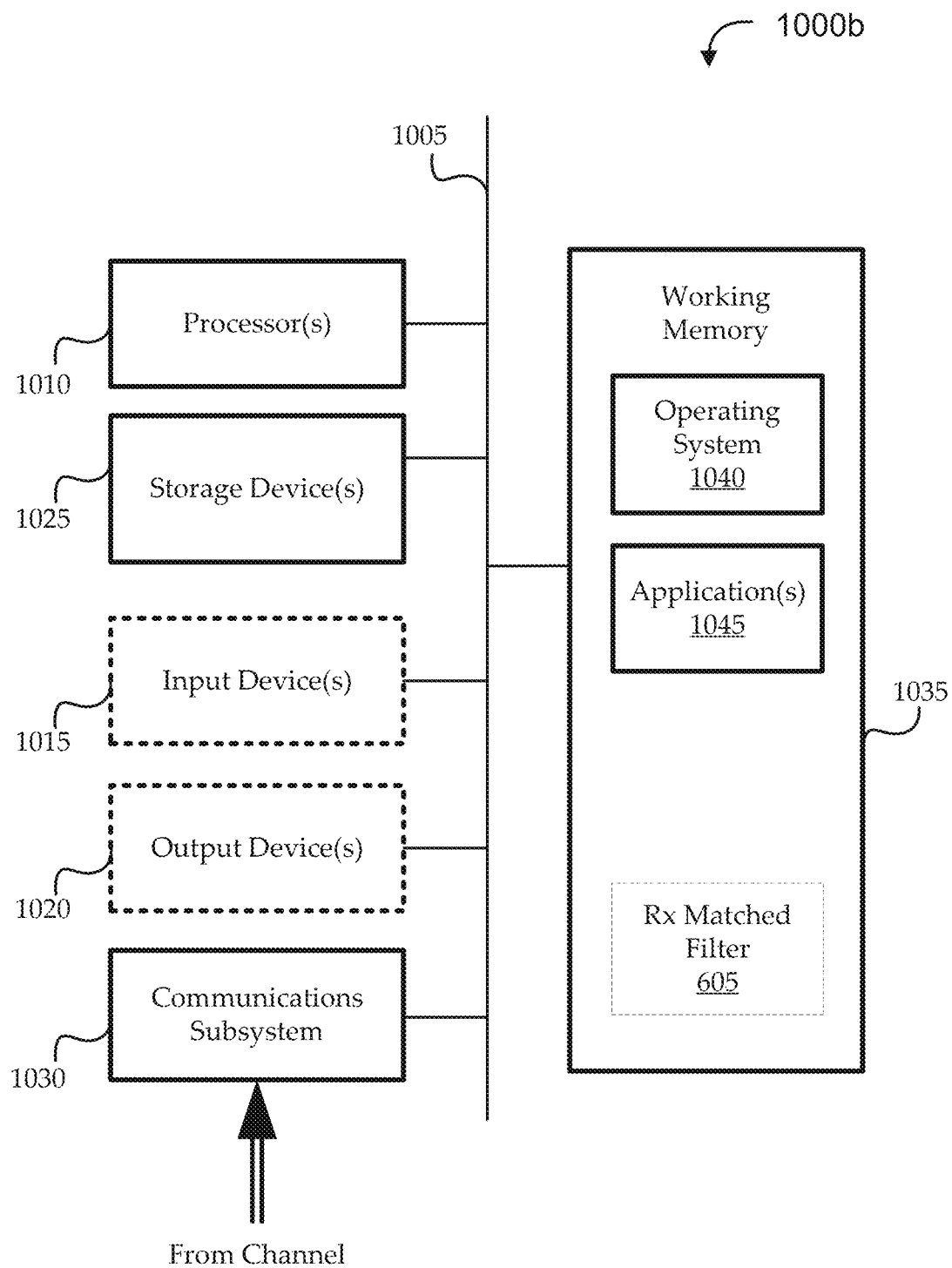

In some embodiments, components of some or all of the transmitter and/or the receiver can be implemented in a computational environment. FIGS. 10A and 10B provide a schematic illustrations of embodiments of a computational system 1000 that can implement various system components and/or perform various steps of methods provided by various embodiments. The computational system 1000a of FIG. 10A represents an illustrative implementation of a transmitter, such as the transmitter 500 of FIG. 5. The computational system 1000b of FIG. 10B represents an illustrative implementation of a receiver, such as the receiver 600 of FIG. 6. It should be noted that FIGS. 10A and 10B are meant only to provide a generalized illustration of various components, any or all of which may be utilized as appropriate. FIGS. 10A and 10B, therefore, broadly illustrate how individual system elements may be implemented in a relatively separated or relatively more integrated manner.

The computational system 1000 is shown including hardware elements that can be electrically coupled via a bus 1005 (or may otherwise be in communication, as appropriate). The hardware elements may include one or more processors 1010, including, without limitation, one or more general-purpose processors and/or one or more special-purpose processors (such as digital signal processing chips, graphics acceleration processors, video decoders, and/or the like). Optionally, embodiments of the computational system 1000 can include one or more input devices 1015, and/or one or more output devices 1020. The input devices 1015 can include user input devices (e.g., a mouse, a keyboard, remote control, touchscreen interfaces, audio interfaces, video interfaces, and/or the like) and/or machine input devices (e.g., computer-to-computer interfaces, such as wired and/or wireless input data ports). Similarly, the output devices 1020 can include user output devices (e.g., display devices, printers, and/or the like), and/or machine input devices (e.g., computer-to-computer interfaces, such as wired and/or wireless output data ports).

The computational system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random-access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 1025 include memory for storing weighting factors, wireless channel models, and/or other information used by embodiments to implement features described herein. The computational system 1000 can also include a communications subsystem 1030, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. As illustrated, the communications subsystem 1030 in FIG. 10A can include any suitable hardware and/or software components for transmitting to a wireless channel (e.g., amplifiers, antennas, etc.); and the communications subsystem 1030 in FIG. 10B can include any suitable hardware and/or software components for receiving from the wireless channel (e.g., amplifiers, antennas, etc.).

In many embodiments, the computational system 1000 will further include a working memory 1035, which can include a RAM or ROM device, as described herein. The computational system 1000 also can include software elements, shown as currently being located within the working memory 1035, including an operating system 1040, device drivers, executable libraries, and/or other code, such as one or more application programs 1045, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general-purpose computer (or other device) to perform one or more operations in accordance with the described methods.

In some embodiments represented by FIG. 10A, the operating system 1040 and the working memory 1035 are used in conjunction with the one or more processors 1010 to implement some or all of the 1+N APSK Modulator 520 and the NNPR transmit filter 525. Some such embodiments can further implement one or more additional components of the transmitter 500, such as transmitter front-end components. In some embodiments represented by FIG. 10B, the operating system 1040 and the working memory 1035 are used in conjunction with the one or more processors 1010 to implement some or all of the receiver matched filter 605. Some such embodiments can further implement one or more additional components of the receiver 600, such as receiver back-end components.

A set of these instructions and/or codes can be stored on a non-transitory (or non-transient) computer-readable storage medium, such as the non-transitory storage device(s) 1025 described above. In some cases, the storage medium can be incorporated within a computer system, such as computational system 1000. In other embodiments, the storage medium can be separate from a computer system (e.g., a removable medium, such as a compact disc), and/or provided in an installation package, such that the storage medium can be used to program, configure, and/or adapt a general-purpose computer with the instructions/code stored thereon. These instructions can take the form of executable code, which is executable by the computational system 1000 and/or can take the form of source and/or installable code, which, upon compilation and/or installation on the computational system 1000 (e.g., using any of a variety of generally available compilers, installation programs, compression/decompression utilities, etc.), then takes the form of executable code.

In some embodiments, the computational system 1000 implements a portion of a system for communicating a data signal in a wireless communication network, as described herein. The non-transitory storage device(s) 1025 can have instructions stored thereon, which, when executed, cause the processor(s) 1010 to convert a stream of information bits to a sequence of symbols; modulate the sequence of symbols onto the data signal, by the 1+N APSK modulator 520, in accordance with a 1+N-ary constellation having an inner constellation point surrounded radially by N outer constellation points (N is an integer greater than two); and pulse-shaping the data signal (e.g., by the NNPR Tx filter 525) with a pulse-shaping waveform to generate a pulse-shaped signal. The instructions can further cause the processor(s) 1010 to direct the communications subsystem 1030 to transmit the pulse-shaped signal over the wireless channel of the wireless communication system.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computational system 1000) to perform methods in accordance with various embodiments of the invention. According to a set of embodiments, some or all of the procedures of such methods are performed by the computational system 1000 in response to processor 1010 executing one or more sequences of one or more instructions (which can be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 can cause the processor(s) 1010 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computational system 1000, various computer-readable media can be involved in providing instructions/code to processor(s) 1010 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a disk of a remote computer. The remote computer can load the instructions into its dynamic memory and send the instructions as signals over a transmission medium to be received and/or executed by the computational system 1000. The communications subsystem 1030 (and/or components thereof) generally will receive signals, and the bus 1005 then can carry the signals (and/or the data, instructions, etc., carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

Figure 11:
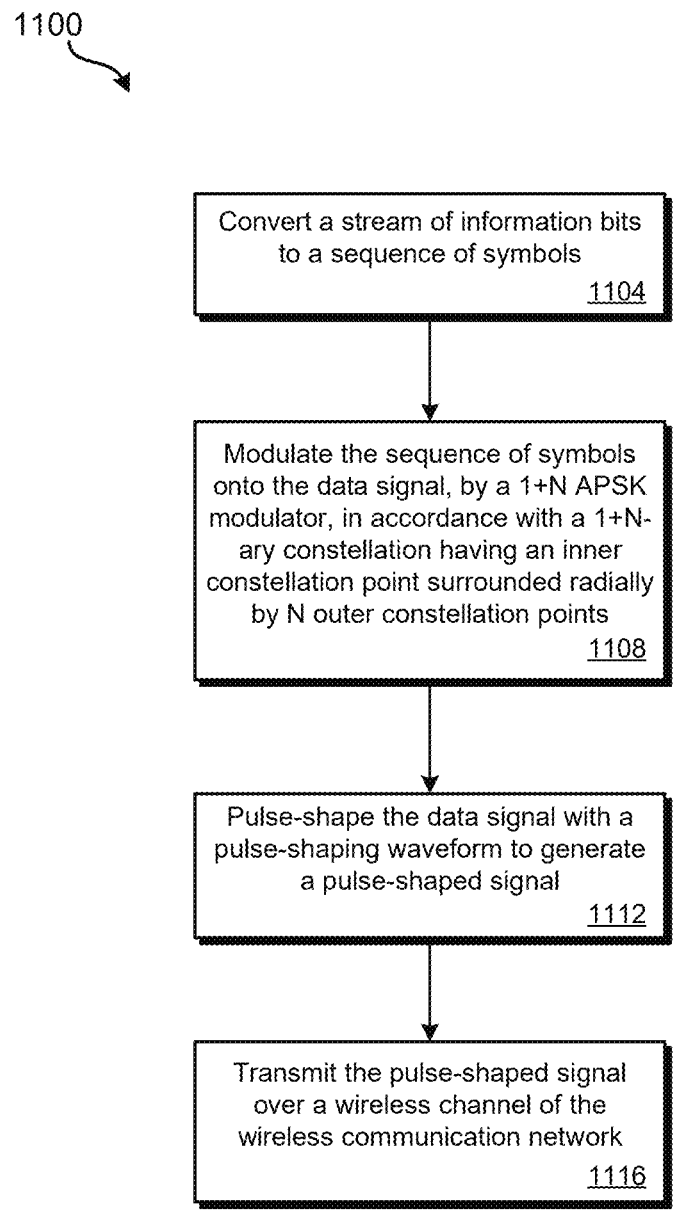
FIG. 11 shows a flow diagram of a method for communicating a data signal in a wireless communication network, according to various embodiments.

FIG. 11 shows a flow diagram of an illustrative method 1100 for communicating a data signal in a wireless communication network. Embodiments of the method 1100 begin at stage 1104 by converting a stream of information bits to a sequence of symbols. At stage 1108, embodiments can modulate the sequence of symbols onto the data signal. As described herein, the modulation in stage 1108 can be performed by a 1+N APSK (amplitude and phase-shift keying) modulator in accordance with a 1+N-ary constellation. Such a constellation has an inner constellation point surrounded radially by N outer constellation points (N is an integer greater than two). For example, the inner constellation point is nominally located at an origin point of an I-Q plane. Each of the outer constellation points can be nominally located a same distance from the inner constellation point, and/or the outer constellation points can be radially distributed around the origin point, so that an arc length between each outer constellation point and its neighbors has a nominal length of $2\pi/N$. In some implementations, N=7. In other implementations, N=15.

At stage 1112, embodiments can pulse-shape the data signal with a pulse-shaping waveform to generate a pulse-shaped signal. As described herein, in some embodiments, the pulse-shaping uses a non-Nyquist pulse-shaping waveform to generate the pulse-shaped signal. For example, the pulse-shaping is performed by a NNPR filter. The pulse shaping can involve weighting a non-Nyquist waveform to generate a weighted non-Nyquist waveform, the non-Nyquist pulse-shaping waveform being the weighted non-Nyquist waveform. In some embodiments, such weighting is based on a first tunable weighting factor, and the pulse-shaping can further involve applying weighted orthogonalization to the weighted non-Nyquist waveform based on a second tunable weighting factor. In such embodiments, the second tunable weighting factor can control a non-zero amount of inter-symbol interference ISI in the non-Nyquist pulse-shaping waveform.

At stage 1116, embodiments can transmit the pulse-shaped signal over a wireless channel of the wireless communication network. Though not explicitly shown, embodiments can further receive the transmitted signal be a receiver. The receiver can include a matched filter to match characteristics of the transmitting pulse-shaping filter. The receiver can also include any suitable components for demodulating, de-interleaving, decoding, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for communicating a data signal in a wireless communication network, the system comprising:
a transmitter to transmit a pulse-shaped signal over a wireless channel of the wireless communication network, the transmitter having:
a front-end configured to convert a stream of information bits to a sequence of symbols;
a 1+N APSK (amplitude and phase-shift keying) modulator to modulate the sequence of symbols onto the data signal in accordance with a 1+N-ary constellation having an inner constellation point surrounded radially by N outer constellation points, wherein N is an integer greater than two; and
a pulse-shaping filter configured to pulse-shape the data signal with a pulse-shaping waveform to generate the pulse-shaped signal.

2. The system of claim 1, wherein:
the inner constellation point is nominally located at an origin point of an I-Q plane; and
each of the outer constellation points is nominally located a same distance from the inner constellation point.

3. The system of claim 1, wherein the outer constellation points are radially distributed around an origin point of an I-Q plane, so that an arc length between each outer constellation point and its neighbors has a nominal length of $2\pi/N$.

4. The system of claim 1, wherein N=7.

5. The system of claim 1, wherein the pulse-shaping filter is a non-Nyquist partial response (NNPR) filter configured to pulse-shape the data signal with a non-Nyquist pulse-shaping waveform to generate the pulse-shaped signal.

6. The system of claim 5, wherein the non-Nyquist pulse-shaping waveform is generated by weighting a non-Nyquist waveform to generate a weighted non-Nyquist waveform.

7. The system of claim 6, wherein:
the weighting is based on a first tunable weighting factor; and
the non-Nyquist pulse-shaping waveform is generated further by applying weighted orthogonalization to the weighted non-Nyquist waveform based on a second tunable weighting factor, the second tunable weighting factor controlling a non-zero amount of inter-symbol interference ISI in the non-Nyquist pulse-shaping waveform.

8. The system of claim 1, further comprising:
a receiver to receive the pulse-shaped signal via the wireless channel, the receiver having a matched filter configured to filtering the received pulse-shaped signal in accordance with pulse-shaping by the pulse-shaping filter.

9. The system of claim 8, wherein:
the matched filter outputs a sequence of symbol samples based on sampling the received pulse-shaped signal; and
the receiver further has a back-end to soft-convert the symbol samples to bit probabilities, and to de-interleave and decode the bit probabilities to obtain a stream of estimated bits corresponding to the stream of information bits.

10. A method for communicating a data signal in a wireless communication network, the method comprising:
converting a stream of information bits to a sequence of symbols;
modulating the sequence of symbols onto the data signal, by a 1+N APSK (amplitude and phase-shift keying) modulator, in accordance with a 1+N-ary constellation having an inner constellation point surrounded radially by N outer constellation points, wherein N is an integer greater than two;
pulse-shaping the data signal with a pulse-shaping waveform to generate a pulse-shaped signal; and
transmitting the pulse-shaped signal over a wireless channel of the wireless communication network.

11. The method of claim 10, wherein:
the inner constellation point is nominally located at an origin point of an I-Q plane; and
each of the outer constellation points is nominally located a same distance from the inner constellation point.

12. The method of claim 10, wherein the outer constellation points are radially distributed around an origin point of an I-Q plane, so that an arc length between each outer constellation point and its neighbors has a nominal length of $2\pi/N$.

13. The method of claim 10, wherein N=7.

14. The method of claim 10, wherein the pulse-shaping uses a non-Nyquist pulse-shaping waveform to generate the pulse-shaped signal.

15. The method of claim 14, wherein the pulse-shaping comprises weighting a non-Nyquist waveform to generate a weighted non-Nyquist waveform, the non-Nyquist pulse-shaping waveform being the weighted non-Nyquist waveform.

16. The method of claim 15, wherein the weighting is based on a first tunable weighting factor, and further comprising:
applying weighted orthogonalization to the weighted non-Nyquist waveform based on a second tunable weighting factor, the second tunable weighting factor controlling a non-zero amount of inter-symbol interference ISI in the non-Nyquist pulse-shaping waveform.

17. A system for communicating a data signal in a wireless communication network, the system comprising:
a set of processors; and
a non-transitory memory having processor-readable instructions stored thereon which, when executed, cause the set of processors to perform steps comprising:
converting a stream of information bits to a sequence of symbols;
modulating the sequence of symbols onto the data signal, by a 1+N APSK (amplitude and phase-shift keying) modulator, in accordance with a 1+N-ary constellation having an inner constellation point surrounded radially by N outer constellation points, wherein N is an integer greater than two; and
pulse-shaping the data signal with a pulse-shaping waveform to generate a pulse-shaped signal.

18. The system of claim 17, wherein the steps further comprise:
transmitting the pulse-shaped signal over a wireless channel of the wireless communication network.

19. The system of claim 17, wherein:
the inner constellation point is nominally located at an origin point of an I-Q plane;
each of the outer constellation points is nominally located a same distance from the inner constellation point; and
the outer constellation points are radially distributed around the origin point of the I-Q plane, so that an arc length between each outer constellation point and its neighbors has a nominal length of $2\pi/N$.

20. The system of claim 17, wherein the pulse-shaping uses a non-Nyquist pulse-shaping waveform to generate the pulse-shaped signal.

* * * * *